United States Patent
Lin et al.

(10) Patent No.: US 7,784,359 B2
(45) Date of Patent: Aug. 31, 2010

(54) CORIOLIS EFFECT MASS FLOW METER AND GYROSCOPE

(75) Inventors: Chuang-Chia Lin, Lakeville, MN (US); Alexander Spivak, Eden Prairie, MN (US); Christopher Sanden, Eden Prairie, MN (US); Odd Harald Steen Eriksen, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 165 days.

(21) Appl. No.: 12/148,162

(22) Filed: Apr. 17, 2008

(65) Prior Publication Data
US 2010/0018326 A1    Jan. 28, 2010

(51) Int. Cl.
*G01F 1/84* (2006.01)
(52) U.S. Cl. .................................. 73/861.354
(58) Field of Classification Search ............ 73/861.354, 73/861.19, 861.356, 861.357
See application file for complete search history.

(56) References Cited

U.S. PATENT DOCUMENTS

| | | | |
|---|---|---|---|
| 3,613,451 A | 10/1971 | Scott | |
| 3,877,304 A | 4/1975 | Vetsch | |
| 4,109,524 A | 8/1978 | Smith | |
| 4,127,028 A | 11/1978 | Cox et al. | |
| 4,161,878 A * | 7/1979 | Fussell, Jr. | 73/861.24 |
| 4,232,550 A * | 11/1980 | Aigner | 73/258 |
| 4,825,705 A | 5/1989 | Hohloch et al. | |
| 4,930,357 A * | 6/1990 | Thurston et al. | 73/861.19 |
| 5,357,811 A | 10/1994 | Hoang | |
| 5,400,653 A | 3/1995 | Kalotay | |
| 6,564,650 B2 | 5/2003 | Ollila et al. | |
| 7,258,025 B2 | 8/2007 | Doihara et al. | |
| 7,275,449 B2 | 10/2007 | Hussain et al. | |

OTHER PUBLICATIONS

Stack, "Coriolis Technology Creates Superior Meters" brochure; Micro Motion, Inc., 2003; pp. 1-4.

* cited by examiner

*Primary Examiner*—Jewel Thompson
(74) *Attorney, Agent, or Firm*—Scott D. Wofsy; Edwards Angell Palmer & Dodge LLP

(57) ABSTRACT

A Coriolis effect device includes a housing defining an interior chamber having a central axis, an inlet, an outlet, a leading disc and a trailing disc. Each disc is supported for oscillatory movement within the interior chamber of the housing. The leading disc defines a leading flow path in fluid communication with the inlet and interior chamber, wherein a portion of the leading flow path extends radially with respect to the central axis. The trailing disc is axially spaced from the leading disc. The trailing disc defines a trailing flow path in fluid communication with the interior chamber and the outlet, wherein a portion of the trailing flow path extends radially with respect to the central axis. A phase difference between leading and trailing oscillating signals picked up from the disc movement can be used to determine a mass flow rate of fluid passing from the inlet to the outlet.

20 Claims, 15 Drawing Sheets

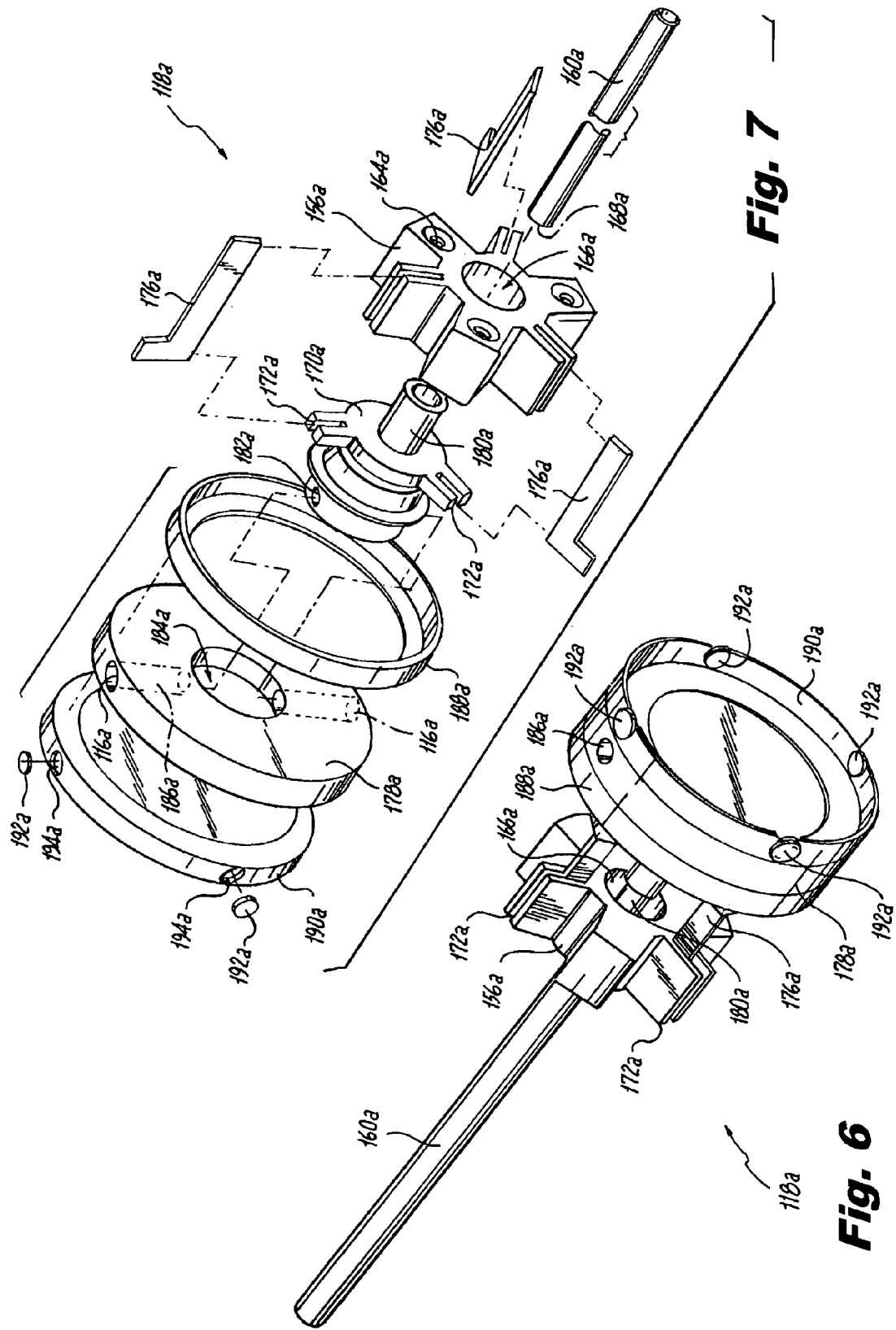

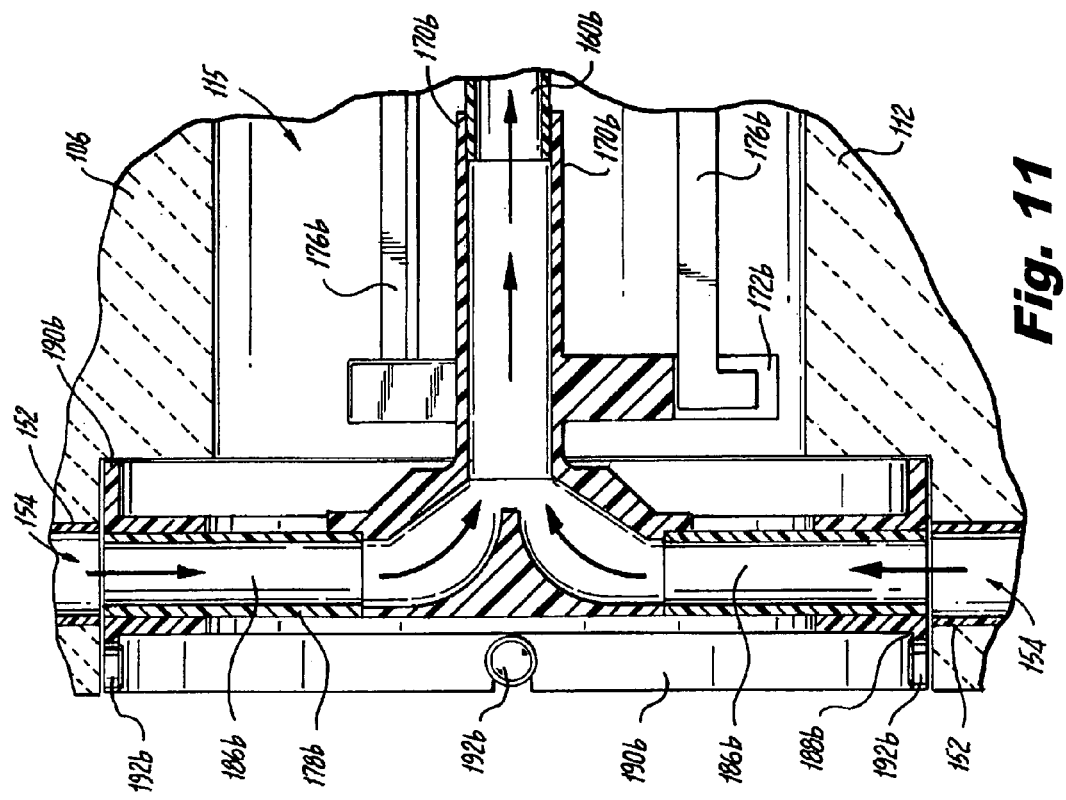
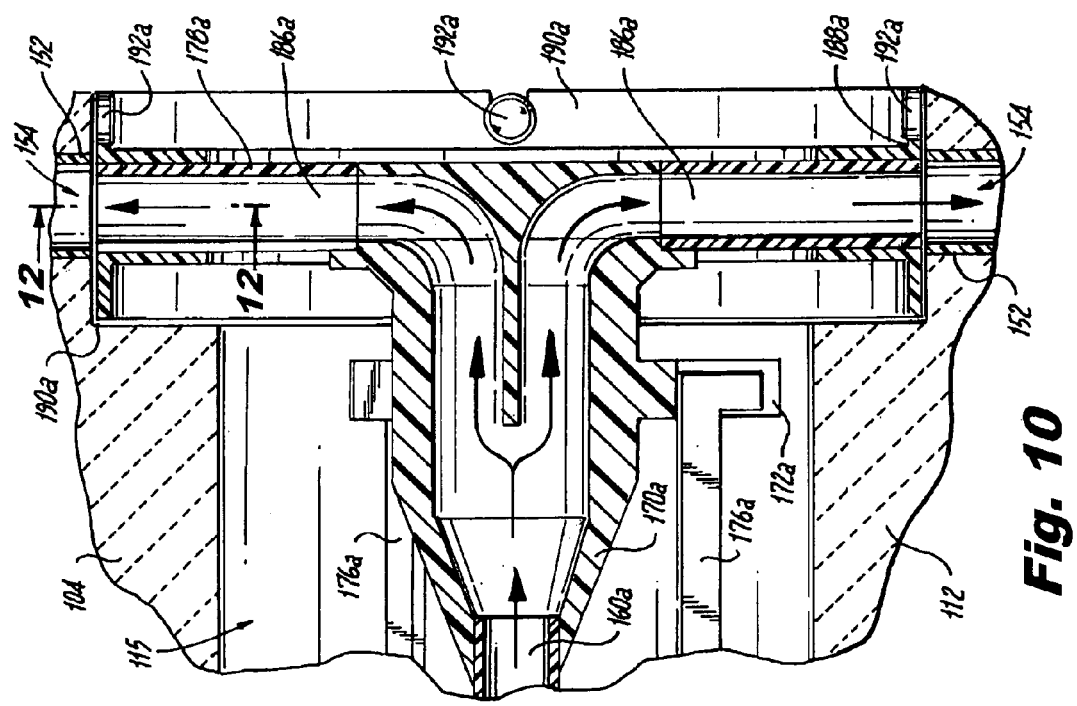

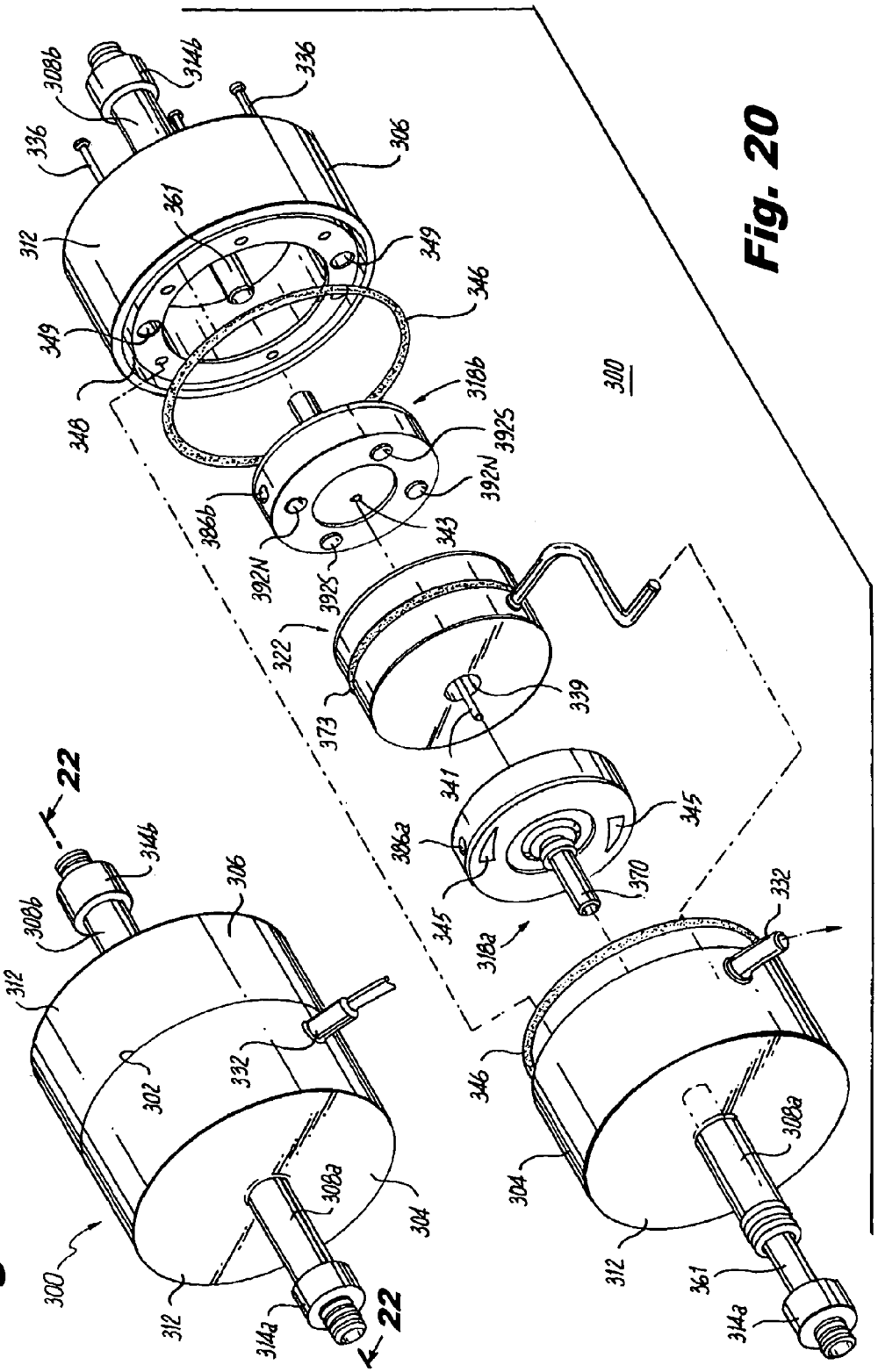

CORIOLIS EFFECT MASS FLOW METER AND GYROSCOPE

BACKGROUND OF THE INVENTION

1. Field of the Invention

The subject invention is directed to a mass flow meter, and more particularly, to a Coriolis effect mass flow rate meter for measuring small amounts of mass fuel flow to a fuel injector in a gas turbine engine. The subject technology may also be used as a gyroscope.

2. Description of Related Art

The next generation of gas turbine engines will include distributed flow architecture, wherein fuel flow to individual injector nozzles will be selectively modulated by an active fuel delivery control system. Such active distributed control system architecture requires individual mass flow rate control for each nozzle rather than the traditional single bulky flow meter near the main fuel tank. Thus, the mass flow sensors will need to be small while operating at small flow rates with fast response times. The estimated flow rates are expected to be about an order of magnitude less than those of conventional main flow stream meters.

By measuring small amounts, errors due to fuel property variation are magnified. For example, fuel can vary significantly from airport to airport and nation to nation as well as under varying weather conditions. Recalibration of the flow sensor to local conditions is not practical so it is desirable to design a flow meter that is insensitive to parameters such as fuel density and viscosity while still being accurate over a broad temperature range. Additionally, the flow meter must function under high pressure conditions without causing an undesirable pressure drop because gas turbine fuel lines may need to maintain a pressure of 1400 psi or more. Of course, the flow meter will also need high performance to match the response of fuel actuators. In view of the above, several flow meters have been developed to meet some of these criteria but none meet them all.

There are many existing methods to measure flow but only a few meet the criteria for being insensitive to local fuel qualities as follows: thermal anemometry that measures flow through heat transfer; an angular momentum-based torque measurement of flow; and Coriolis flow sensing of flow. Thermal anemometry is poorly suited to use across broadly varying temperature ranges. Torque measurement uses complex mechanical features that cannot be miniaturized. For example, U.S. Pat. Nos. 3,613,451 and 3,877,304, which are incorporated herein by reference in their entirety, disclose bulky torque measurement flow meters.

A Coriolis mass flow rate meter for measuring flow rates is disclosed in U.S. Pat. No. 4,127,028, which is incorporated herein by reference in its entirety. This flow rate meter is in the form of two vibrating U-shaped tubes. The U-shaped tubes also have the same natural frequency for longitudinal and torsoinal oscillations. Sensors are mounted away from the fixed ends of the tubes to detect the Coriolis effect. In order to increase the twist from the Coriolis effect, portions of the tubes are more widely separated in the area where the sensors are located. The Coriolis effect causes a difference between the signals of the sensors, such difference being proportional to the flow through the tubes.

Another Coriolis mass flow meter is disclosed in U.S. Pat. No. 6,564,650 (the '650 patent), which is incorporated herein by reference in its entirety. This flow meter 400 of the '650 patent uses dual loops 151, 152 formed from a single piece of tubing. An anchor 401 fixes the loops 151, 152 to a housing 450. A drive coil 131 causes the loops 151, 152 to oscillate in opposition to each other so that the assembly is balanced. Sensors 132, 133 determine the velocity of the loops 151, 152 during oscillation.

Although each of the Coriolis flow meters above can provide accurate measurements, each is relatively bulky and, thus, poorly suited to application on an individual injector nozzle. Additionally, applications require small flow rate measurements that typically dictate light and miniaturized flow meters; this is particularly true in aerospace applications where space and weight are primary considerations. The devices required for small flow rates present extraordinary manufacturing and performance difficulties.

Additionally, in high pressure applications, the tubes of the Coriolis flow meters are required to have thicker walls. The thicker walls significantly reduce the sensitivity or response to the Coriolis effect. In combination with the complete loop in which the ends are fixed, the resulting assembly becomes too rigid to perform well along with limiting the ability to create a compact/miniature flow meter. Thus, prior art Coriolis flow meters are poorly suited to adapt to high pressure, provide rapid response, and be utilized in small flow applications.

SUMMARY OF THE INVENTION

It would be beneficial therefore, to provide a mass flow meter that is adapted and configured to provide accurate flow rate measurements for small flow rate applications while being relatively small and independent of local fuel variations. A desirable flow meter is also well-suited to high pressure applications, balanced and functions across wide temperature ranges.

In one embodiment, the subject technology is directed to Coriolis effect mass flow meter comprising a housing defining an interior chamber having a central axis, an inlet and an outlet. A leading disc is supported for oscillatory movement within the interior chamber of the housing, the leading disc defining a leading flow path in fluid communication with the inlet, wherein a portion of the leading flow path extends radially with respect to the central axis so that fluid passing therein generates a first Coriolis force on the leading disc. A leading sensor produces a leading oscillating signal representative of the oscillatory movement of the leading disc. A trailing disc, axially spaced from the leading disc, is also supported for oscillatory movement within the interior chamber, the trailing disc defining a trailing flow path in fluid communication with the leading flow path and the outlet, wherein a portion of the trailing flow path extends radially with respect to the central axis so that fluid passing therein generates a second Coriolis force on the trailing disc. A trailing sensor produces a trailing oscillating signal representative of the oscillatory movement of the trailing disc, wherein a phase difference between the leading and trailing oscillations can be used to determine a mass flow rate of fluid passing from the inlet to the outlet. The signals could be sinusoidal waves, square waves, triangular waves and the like as would be appreciated by those of ordinary skill.

The Coriolis effect mass flow meter may also have the flow path of the discs at least partially connected by a tubular structure attached to the housing. A spacer may be within the interior chamber to separate the leading and trailing disc. The interior chamber may contain pressurized fluid.

In another embodiment, the subject technology is also directed to a Coriolis effect device including a housing defining an interior chamber having a central axis, an inlet and an outlet, a leading disc supported for oscillatory movement within the interior chamber of the housing. The leading disc defines a leading flow path in fluid communication with the inlet and interior chamber, wherein a portion of the leading flow path extends radially with respect to the central axis. A trailing disc is axially spaced from the leading disc and supported for oscillatory movement within the interior chamber. The trailing disc defines a trailing flow path in fluid communication with the interior chamber and the outlet, wherein a portion of the trailing flow path extends radially with respect to the central axis.

The Coriolis effect device may be used as a flow meter and further comprise a motor to drive the discs to oscillate, sensors to produce a leading oscillating signal representative of the oscillatory movement of the leading disc and a trailing oscillating signal representative of the oscillatory movement of the trailing disc, wherein fluid passing from the inlet to the outlet generates opposing Coriolis forces on the discs so that a phase difference between the leading and trailing oscillating signals occurs that can be used to determine a mass flow rate of the fluid.

The Coriolis effect device may also be used as a gyroscope and further comprises a source to provide a constant flow of fluid from the inlet to the outlet, sensors to produce a leading signal representative of a Coriolis force generated by rotational movement of the leading disc and a trailing signal representative of a Coriolis force generated by rotational movement of the trailing disc, wherein an angular displacement difference between the leading and trailing signals can be used to realize a signal that is proportional to the rate of rotation.

Another Coriolis effect mass flow meter is directed to a) a housing defining a sealed interior chamber having an inlet and an outlet, b) a leading disc assembly supported for rotational movement within the sealed interior chamber, the leading disc assembly defining a leading flow path having a first end in fluid communication with the inlet and a second end in fluid communication with the sealed interior chamber, wherein at least a portion of the leading flow path generates a first Coriolis force on the leading disc assembly when fluid passes there through, c) a leading sensor to produce a leading oscillating signal representative of the movement of the leading disc assembly, d) a trailing disc assembly supported for movement within the sealed interior chamber, the trailing disc assembly defining a trailing flow path having a first end in fluid communication with the sealed interior chamber and a second end in fluid communication with the outlet, wherein at least a portion of the trailing flow path generates a second Coriolis force on the trailing disc assembly when fluid passes there through, and e) a trailing sensor to produce a trailing oscillating signal representative of the movement of the trailing disc assembly, wherein a phase difference between the leading and trailing oscillating signals can be used to determine a mass flow rate of the fluid passing from the inlet to the outlet.

The Coriolis effect mass flow meter may have the leading disc assembly configured to include: a collar fixed to the housing for supporting the leading disc assembly and defining a central bore and at least one mounting stanchion; a leading flange having an inlet extending through the central bore to couple with the inlet of the housing and at least one mounting stanchion, wherein the leading flange splits and turns the flow path approximately ninety degrees to form at least one outlet; a leading disc fixed to the leading flange and defining radial passages that align with the at least one outlet; and at least one torsion spring extending between the collar mounting stanchion and the flange mounting stanchion so that the leading flange and leading disc are fixed axially but able to oscillate about a central axis. Preferably, the at least one mounting stanchion is three or more symmetrically spaced stanchions that provide radial stability. Optionally, a torsional spring/rod links both disks. The torsional spring/rod can be use to supplement or replace the springs between collar and flange to minimize unwanted disk motion and vibration. Alternatively, fluidic bearings that utilize existing high pressure fluid (e.g., fuel) can be integrated to replace the springs to support the disks and minimize unwanted disk motion and vibration.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the subject invention without undue experimentation, preferred embodiments thereof will be described in detail hereinbelow with reference to certain figures, wherein:

FIG. 6 is a perspective view of the leading disk assembly of FIG. 5 separated from the mass flow meter;

FIG. 7 is an exploded perspective view of the disk assembly of FIG. 6;

FIG. 10 is a detailed cross-sectional view illustrating fuel through the leading disk assembly of FIG. 1;

FIG. 11 is a detailed cross-sectional view illustrating fuel through the trailing disk assembly of FIG. 1;

FIG. 19 is a perspective view of another mass flow meter in accordance with the subject invention;

FIG. 20 is a partially exploded perspective view of the mass flow meter of FIG. 19;

DETAILED DESCRIPTION OF PREFERRED EMBODIMENTS

Figure 1:
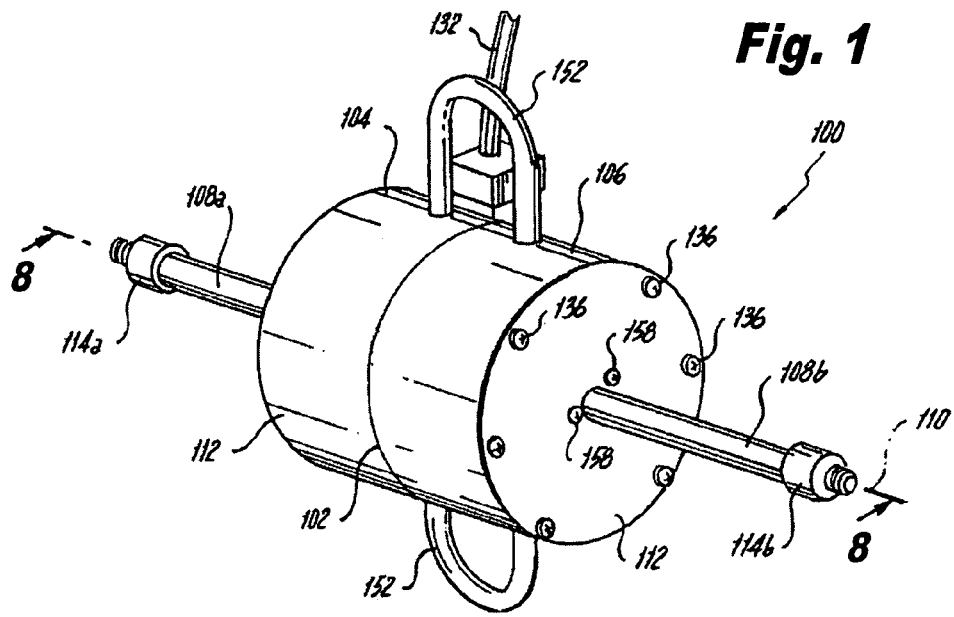
FIG. 1 is a perspective view of a mass flow meter in accordance with the subject invention.

Referring now to the drawings, there is illustrated in FIG. 1 a perspective view of a mass flow meter in accordance with the subject invention and referred to generally by the reference numeral 100. In overview, the flow meter 100 measures the mass of the fluid passing there through by using the Coriolis effect. Many if not all the features of the flow meter 100 are symmetrical across a midpoint 102 between a leading half 104 and a trailing half 106 of a housing 112. The following description is more detailed with respect to the leading half 104 of the flow meter 100. Like reference numerals are used on the trailing half 106 to identify or otherwise refer to similar structural features or elements but with the letter "b" appended thereto rather than the letter "a" as used in the leading half 104.

The flow meter 100 is connected inline with the fuel fluid path so that the fuel flow enters an inlet tube 108a, which is substantially along a central axis 110, and exits an outlet tube 108b. The tubes 108a, 108b have connectors 114a, 114b to sealingly couple the flow meter 100 into a fluid delivery system. The housing 112 is intermediate the inlet and outlet tubes 108a, 108b. The housing 112 defines an interior chamber 115 (see FIGS. 3, 4 and 8) that retains the components of the flow meter 100.

Figure 2:
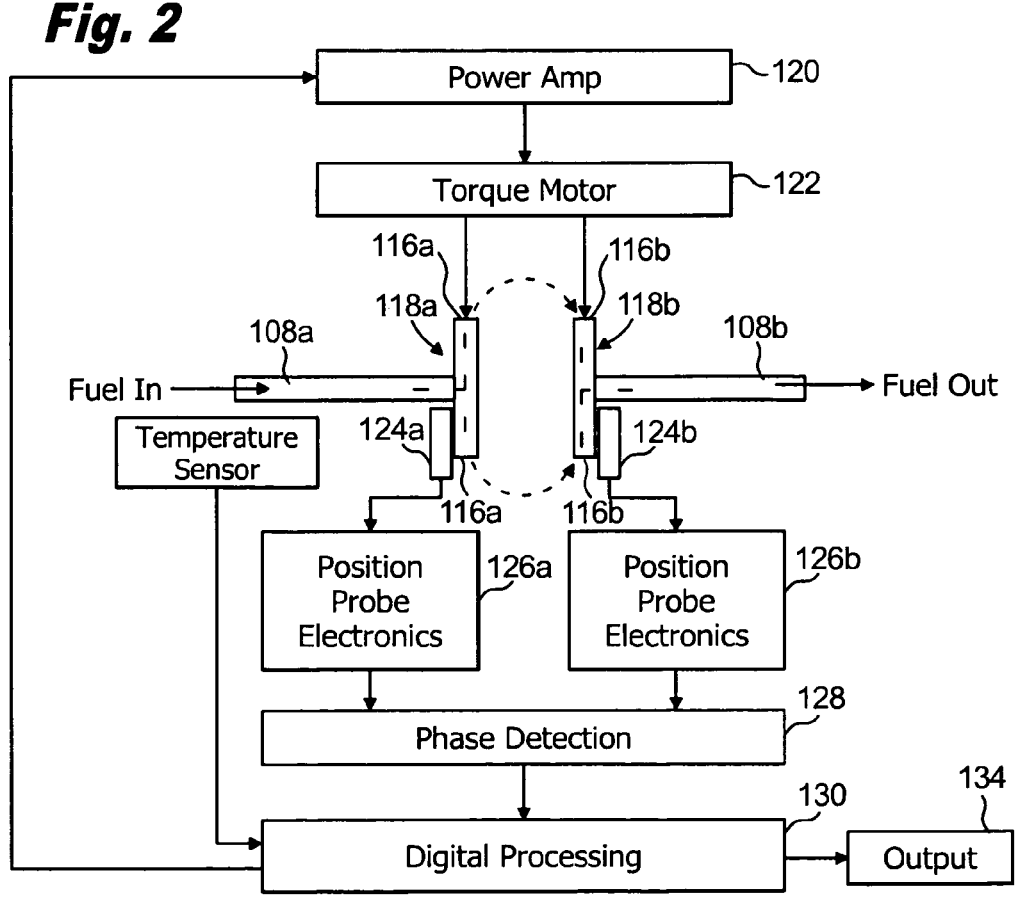
FIG. 2 is a schematic block diagram of a mass flow meter in accordance with the subject invention.

Referring to FIG. 2, a schematic block diagram of the flow meter 100 is shown with the flow path represented by dashed arrows. The fuel enters the flow path by the inlet tube 108a. Eventually, the flow path splits turns approximately 90 degrees to form two intermediate openings 116a. Although two intermediate openings 116a are shown, one or any number be utilized for various applications. The intermediate openings 116a are fixed to or integral with a leading disc assembly 118a that is supported for oscillatory movement about the central axis 110 within the interior chamber 115. By coupling or integrating the intermediate openings 116a to the leading disc assembly 118a, fuel flow passing through the intermediate openings 116a generates a Coriolis force on the leading disc assembly 118a.

The fuel exits the intermediate openings 116a and passes into a pair of intermediate openings 116b fixed to or integral with a trailing disc assembly 118b, which is mirror image of the leading disc assembly 118a. The trailing disc assembly 118b is axially spaced from the leading disc assembly 118a but also supported for oscillatory movement about the central axis 110 within the interior chamber 115. The oscillation of the trailing disc assembly 118b is synchronized with the oscillation of the leading disc assembly 118a during normal conditions, e.g., no fuel flow.

After passing into the intermediate inlets 116a, the fuel flow is combined and turned approximately 90 degrees into a single flow again along the central axis 110. As with the leading disc assembly 118a, fuel flowing through the trailing disc assembly 118b generates a Coriolis force therein, however, in an opposing direction from that of the Coriolis force on the leading disc assembly 118a. These Coriolis forces are equal to two times the cross product of flow velocity and angular velocity. The Coriolis forces induce a torque that shifts the timing or phase of the angular displacement of both disc assemblies 118a, 118b. The phase shift of angular displacement is proportional to the mass flow rate.

Turning to the electrical components of FIG. 2, a power amplifier 120 and torque motor 122 drive the oscillation of the disc assemblies 118a, 118b. Position pick-up probes 124a, 124b for each disc assembly 118a, 118b produce respective oscillating signals representative of the oscillatory movement. The oscillating signals are passed through position probe electronics modules 126a, 126b to be processed in a phase detection module 128. The power amplifier 120, position probes 124a, 124b, position probe electronics modules 126a, 126b and phase detection module 128 are in communication with a digital processor or microcontroller 130. Signals pass into and out of the housing 112 via electrical lines housed in a cable 132 (see FIG. 1).

The digital processor 130 controls the power amplifier 120 and, in turn, the torque motor 122 so that the oscillating signals are normally in phase. The oscillating signals pass into the phase detection module 128 that works with the digital processor 130. When fuel flows, the Coriolis forces on the disc assemblies 118a, 118b create the phase difference between the respective signals that are used to realize the mass flow rate of the fluid passing through the flow meter 100. In other words, computing this phase difference between the leading and trailing oscillating signals generates an output 134 that indicates mass flow.

Figure 3:
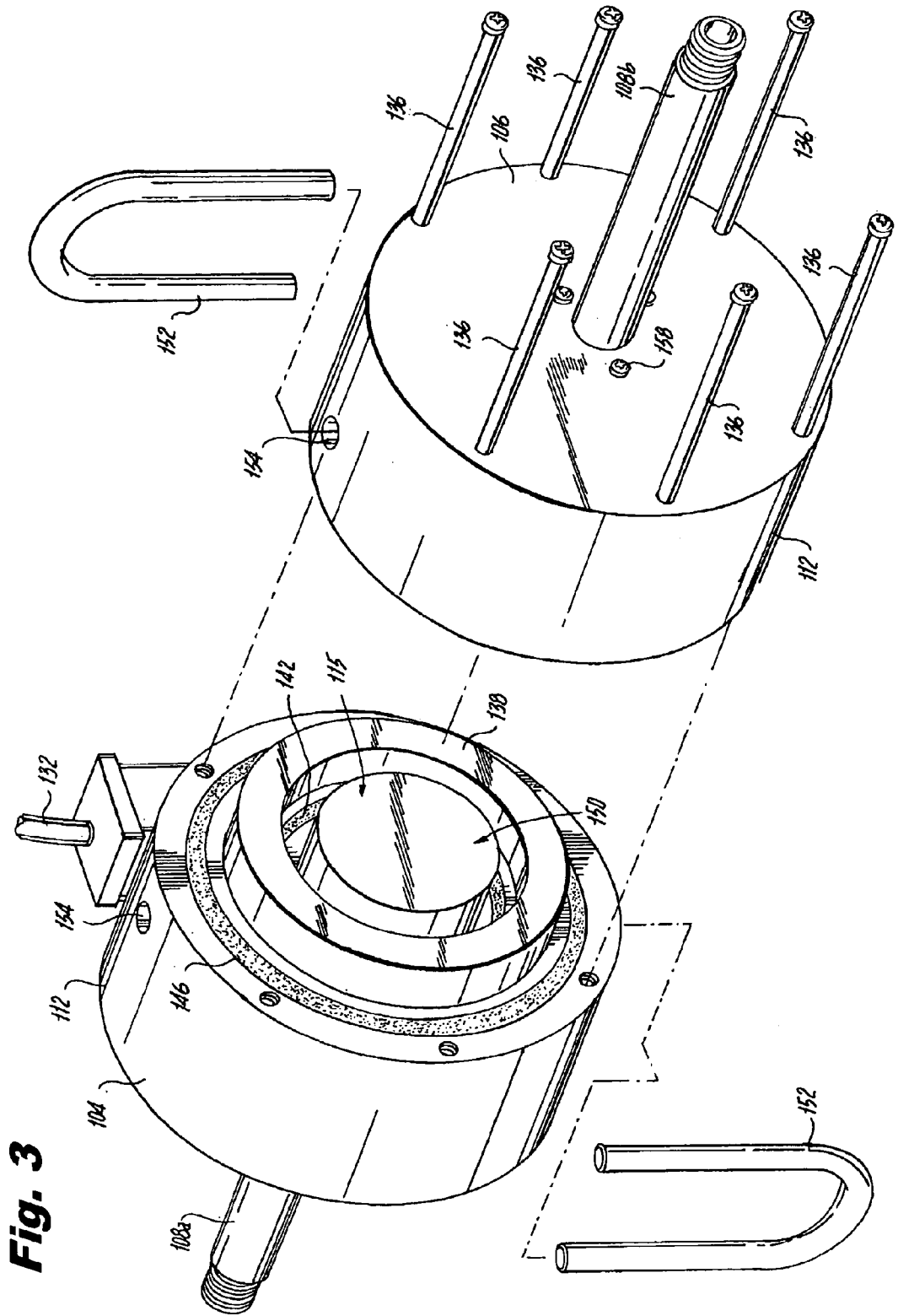
FIG. 3 is a partially exploded perspective view of the housing for the mass flow meter of FIG. 1.

Referring to FIG. 3, a partially exploded perspective view of the housing 112 and components therein for the mass flow meter 100 are shown. The housing 112 is designed so that the interior chamber 115 is sealed even at high pressure such as pressure in excess of 1400 psi as pressure of 2000 psi or more is typical in gas turbine engine fuel lines. The leading half 104 and the trailing half 106 of the housing 112 are secured together by bolts 136. The housing 112 may be sealed in various manners to reliably maintain a high pressure environment such as by welding, interference fit and the like. The inlet and outlet tubes 108a, 108b are fixed to the respective halves 104, 106 by threading into a bore or like known sealing engagement. Near the midpoint 102, the housing 112 contains a motor coil 138 that is part of the torque motor 122. The motor coil 138 may be a ring or other shape. Each half 104, 106 also contains disc assemblies 118a, 118b as discussed further below. Preferably, the housing 112 and disc assemblies 118a, 118b are fabricated from aluminum, a composite, polymer, ceramic, and combinations of these or other non-magnetic material.

Figure 4:
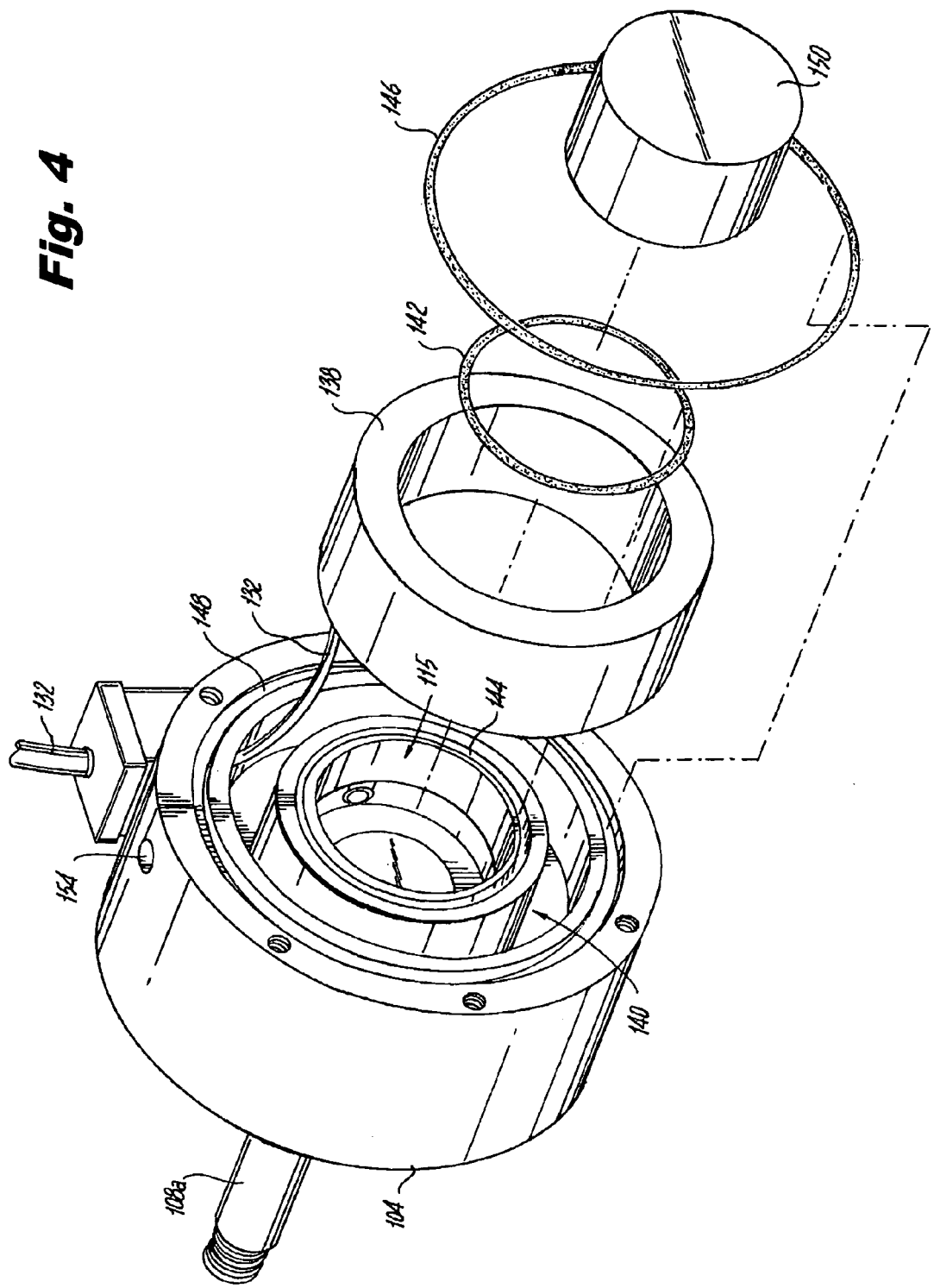
FIG. 4 is a partial exploded perspective view of the leading or fuel inlet half of the housing and motor components for the mass flow meter of FIG. 1.
Figure 8:
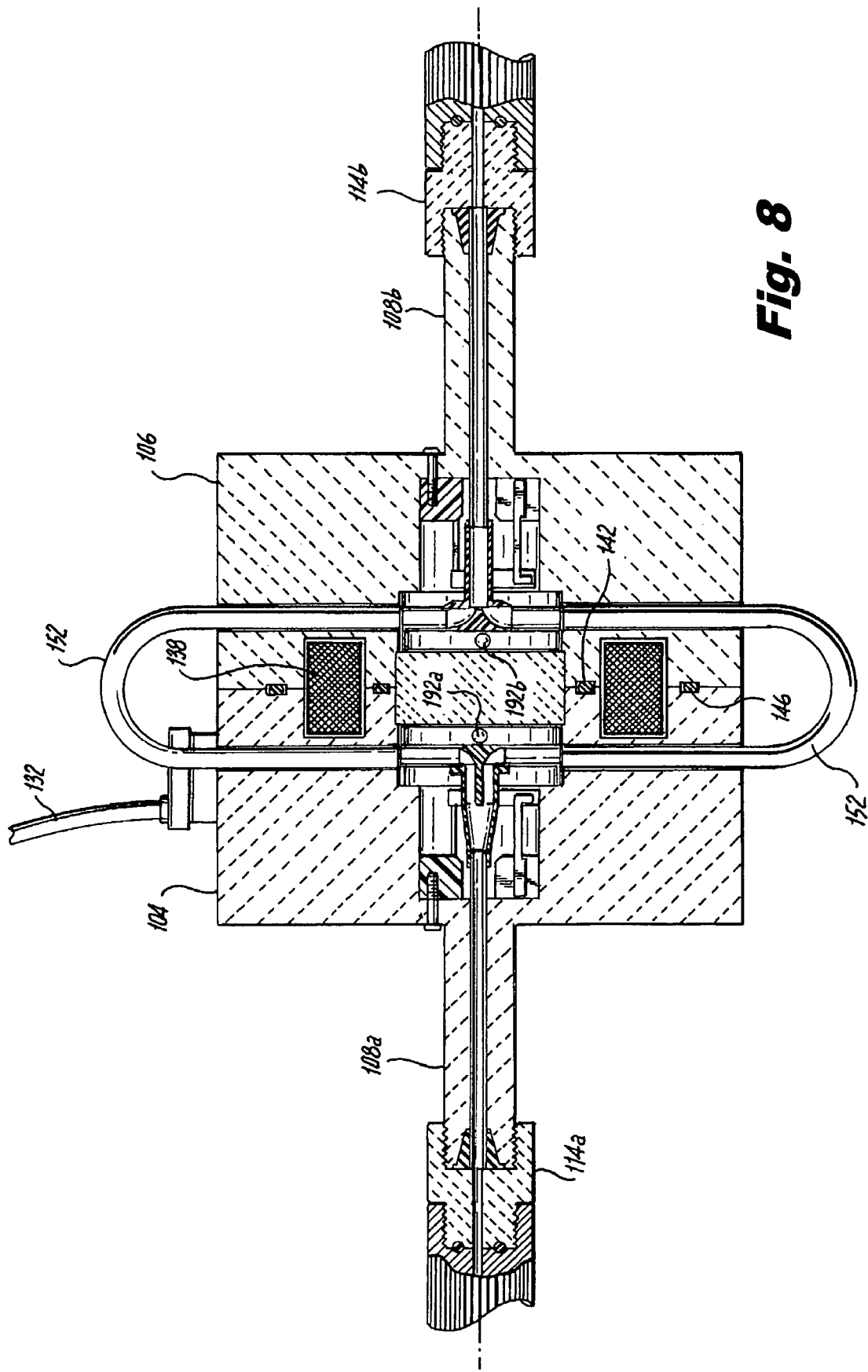
FIG. 8 is a cross-sectional view substantially along the central axis of the mass flow meter as shown in FIG. 1.
Figure 9:
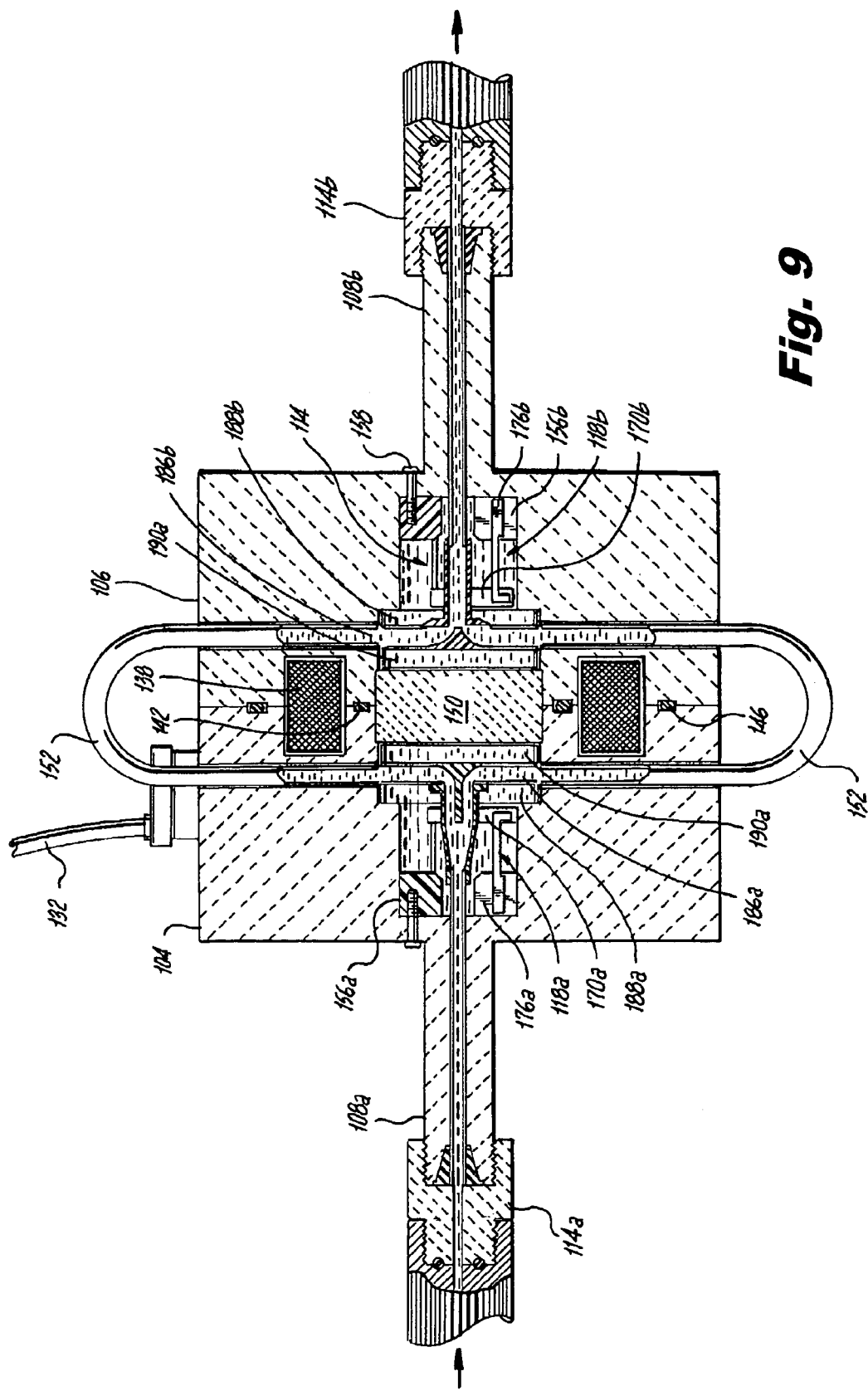
FIG. 9 is another cross-sectional view along the central axis of the mass flow meter of FIG. 1 with fuel in the flow path.

Referring to FIG. 4 in addition to FIG. 3, a partially exploded perspective view of the housing 112 and components therein for the mass flow meter 100 is shown. The leading half 104 forms an annular gap 140 that contains at least a portion of the torque motor coil 138. Alternatively, a torque motor can be used instead of the ring motor 138 so that flow is not blocked and the overall device size/diameter is reduced. An inner seal ring 142 fits in an inner groove 144 and an outer seal ring 146 fits in an outer groove 148 to prevent high pressure fuel from leaking out of the assembled housing 112. The interior chamber 115 also holds a central spacer 150 that divides the interior chamber 115 into a leading portion and a trailing portion within the respective half 104, 106. The central spacer 150 could also be a permeable element that allows fluid to pass from the leading half 104 to the trailing half 106. Thus, the tubing and related features may be removed. In such circumstances, the central spacer 150 would also serve to dampen turbulence. The leading disc assembly 118a fits in the leading half 104 and the trailing disc assembly 118b fits in the trailing half 106 as best shown in FIGS. 8 and 9. The central spacer 150 separates fluid flow between the two halves 104, 106. Preferably, the central spacer 150 is a non-magnetic material such as aluminum. Two U-shaped tubes 152 sealingly couple into bores 154 formed in the housing 112 so that the leading half 104 and trailing half 106 of the housing 112 are in fluid communication around the central spacer 150 as best seen in FIGS. 3, 8 and 9.

Figure 5:
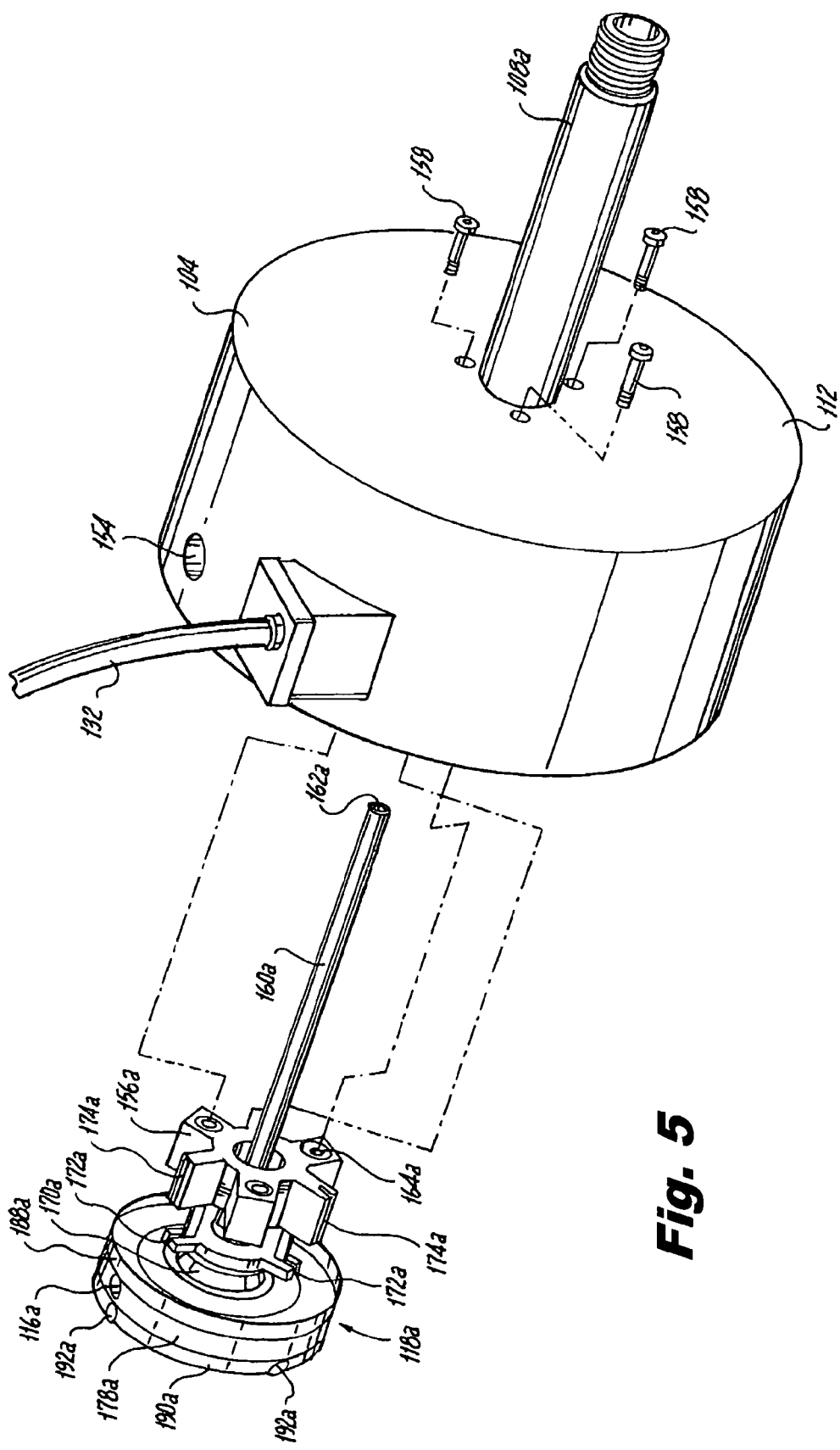
FIG. 5 is a partial exploded perspective view of the leading or fuel inlet half of the housing and leading disc assembly for the mass flow meter of FIG. 1.

Referring now to FIG. 5, a perspective view of the leading disc assembly 118a removed from the leading half 104 of the housing 112 for the mass flow meter 100 is shown. The leading disc assembly 118a has a collar 156a coupled to the housing 112 by bolts 158 to mount the leading disc assembly 118a within the interior chamber 115. The leading disc assembly 118a also has an inlet feed tube 160a with a first end 162a coupled within the inlet tube 108a. The coupling between the inlet feed tube 160a and the inlet tube 108a may be fluid tight or designed to leak so that the interior chamber 115 is filled with high pressure fluid upon start up.

Referring to FIGS. 6 and 7 in addition to FIG. 5, a perspective and exploded view, respectively, of the leading disc assembly 118a are shown. The collar 156a has threaded bores 164a for engaging the bolts 158. The collar 156a also defines a central bore 166a. A second end 168a of the inlet feed tube 160a extends through the central bore 166a to couple within an inlet flange 170a. The collar 156a and inlet flange 170a both define three mounting stanchions 172a, 174a, respectively. Three torsion springs 176a extend between the collar mounting stanchions 172a and the flange mounting stanchions 174a so that the inlet flange 170a and leading disc 178 are fixed axially and stabilized radially but able to oscillate rotationally about the central axis 110.

In another embodiment, tight spacing between flange 180a and the inlet tube 108a of the housing 112 forms fluid bearings. Properly designed fluid bearing can replace springs 176a and collar 156a to confine any radial motions and limit the disc to oscillate rotationally. As a result, the overall dimension, number of components and complexity can be further reduced.

The inlet flange 170a forms the portion of the flow path that splits and turns the fuel as best seen in FIG. 10. Thus, the inlet flange 170a has one inlet 160a and two outlets 182a. The inlet flange 170a is fixed within a hole 184a defined in the disc 178a of the leading disc assembly 118a so that the inlet flange 170a supports the leading disc 178a. The disc 178a also defines two radial passages 186a that form the intermediate openings 116a at the periphery of the disc 178a. The radial passages 186a align with the two outlets 182a of the inlet flange 170a when assembled. The disc 178a also includes a first annular flange 188a and a second annular flange 190a. The first annular flange 188a is provided to enhance balance. The second annular flange 190a retains four magnets 192a in equally spaced apertures 194a as part of the motor drive. Either flange 188a, 190a may include an item for positional feedback e.g., a portion of the probe 124a. Any number or type of pick up sensor can be used to determine position of the disc 178a, which can be driven by any motor type now known or later developed.

Referring to FIGS. 8 and 9, cross-sectional views of the assembled flow meter 100 are shown. The central spacer 150 separates the leading disc assembly 118a from the trailing disc assembly 118b and substantially prevents fluid from passing between the leading half 104 and trailing half 106 of the housing 112. Preferably, the trailing disc assembly 118b is a mirror image of the leading disc assembly 118a. However, as fuel passes from the leading half 104 to the trailing half 106, the intermediate openings 116a of the leading disc 178a are the corresponding intermediate inlets 116a of the trailing disc 178b. Similarly, the inlet flange 170a of the leading disc assembly 118a is an outlet flange 170b on the trailing disc assembly 118b because the outlet flange 170b couples to the outlet feed tube 160b, which couples to the outlet tube 108b.

Motor Drive and Feedback

In operation, the discs 178a, 178b are driven by the single torque motor coil 138 to resonate between two predetermined angles to establish a oscillating angular velocity. The drive signal is selectively supplied through the electrical cable 132 to the motor coil 138, which generates a varying electric field around the disc assemblies 118a, 118b. The magnets 192a, 192b of the second annular flange 190a, 190b of each disc 178a, 178b interact with the electric field to create a movement force so that the respective disc 178a, 178b, inlet flange 170a, 170b and inlet feed tube 160a, 160b oscillate. Preferably, the oscillation amplitude is small such as 0.1 mm or less.

Pick-up probes 124a, 124b mounted in the housing 112 interact with the discs 178a, 178b to generate the oscillating positional feedback signal based on the oscillatory motion. The pick-up probes 124a, 124b may be any of a variety of types with a component mounted in the housing 112 and/or on the discs 178a, 178b. Capacitive plate, magnetic coils, optical interrupt, and hall effect sensors are all easily adapted to the subject technology.

As each disc 178a, 178b is normally in phase, the resulting phase difference with no fuel flow is zero. As flow generates opposing Coriolis forces on the discs 178a, 178b, a phase shift between the positional signals occurs that represents the motion of the discs 178a, 178b. This differential phase measurement or time lag between the rotation of the discs 178a, 178b is proportional to the mass flow so that the mass flow can be realized.

Fuel Flow

Still referring to FIGS. 8 and 9, fuel enters the inlet tube 108a and proceeds to the inlet feed tube 160a. The inlet feed tube 160a may thread into the inlet tube 108a or otherwise be fixed in place. The inlet flange 170a is oscillating so that the inlet 180a surrounds the second end 168a of the inlet feed tube 160a. As a result, the fuel flows into the inlet flange 170a.

Referring to FIG. 10, the inlet flange 170a forks the flow-path substantially along the central axis 110 and turns each portion approximately 90 degrees to exit the two outlets 182a. The flange outlets 182a are aligned and in fluid communication with the radial passages 186a in the leading disc 178a. As fluid mass passes radially outward through the inlet flange 170a and radial passages 186a of the leading disc 178a, a Coriolis force is exerted on the leading disc 178a that causes the phase shift in the respective oscillating signal.

Figure 12:
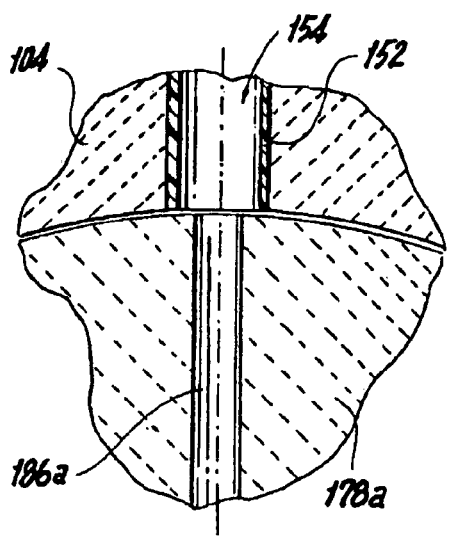
FIG. 12 is a cross-sectional view of the radial bore of the leading disk assembly in a nominal position with respect to the leading end of the U-shaped tube as seen from line 12-12 of FIG. 10.
Figure 13:
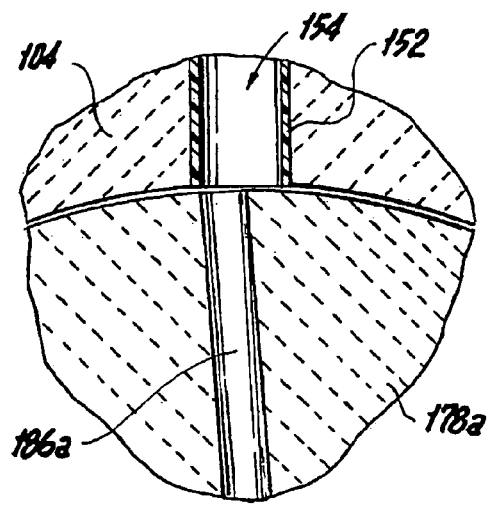
FIG. 13 is a cross-sectional view of the radial bore of the leading disk assembly in an exaggerated clockwise rotated position with respect to the leading end of the U-shaped tube as seen from line 12-12 of FIG. 10.
Figure 14:
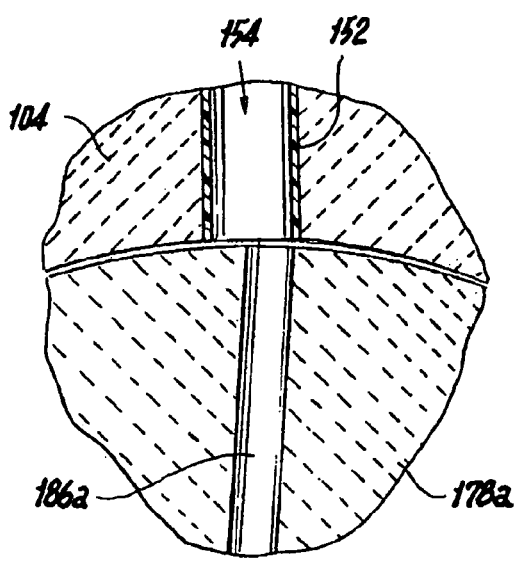
FIG. 14 is a cross-sectional view of the radial bore of the leading disk assembly in an exaggerated counter-clockwise rotated position with respect to the leading end of the U-shaped tube as seen from line 12-12 of FIG. 10.

Referring again to FIGS. 8 and 9, at the periphery of the leading disc 178a, the radial passages 186a terminate in the intermediate openings 116a that align with the U-shaped tubes 152 inserted in the housing 112. In the nominal position, the radial passages 186a are centrally located with respect to the openings of the U-shaped tubes 152 as best seen in FIG. 12. Even in the exaggerated clockwise and counter-clockwise rotated positions shown in FIGS. 13 and 14, respectively, the radial passages 186a are still aligned and in fluid communication with the respective U-shaped tube 152 because the oscillation is so small. Additionally, fluid may initially seep out of from the interface between the radial passages 186a and U-shaped tube 152 to fill the interior chamber 115 with high pressure fluid.

The U-shaped tubes 152 route the fuel flowing there through into the pair of radial passages 186b formed in the trailing disc 178b. Again, even though the trailing disc 178b is also oscillating, the size and configuration of the U-shaped tube 152 and radial passages 186b is such that the fuel passes into the radial passages 186 of the trailing disc 178b. Because the trailing half 106 of the interior chamber 115 is also fully pressurized and sealed, the flowing fuel also does not have an alternative flow path in normal operation.

For the trailing disc 178b, the radial passages 186b bring the fuel flow into the centrally located outlet flange 170b that combines the flow path and turns the resulting single flow approximately 90 degrees along the central axis 110. As fluid mass passes radially inward through the radial passages 186b and outlet flange 170b of the trailing disc 178b, a Coriolis force is exerted on the trailing disc 178b that causes the phase shift in the respective oscillating signal. Along the central axis 110, the flange outlet 180b fluidly connects to the outlet feed tube 160b by threads or other like means, to eventually pass the flowing fuel into and out of the outlet 108b.

At several locations, such as at the interface between the discs 178a, 178b and U-shaped tubes 152, fluid may be allowed to escape into the interior chamber 115 or the interior chamber 115 may be otherwise pressurized. The flow meter 100 is preferably designed so that fluid consequently collects in the interior chamber 115 and is maintained at a high pressure. As a result, there is substantially a pressure balance across the discs 178a, 178b even though a high pressure fluid is passing through the respective radial passages 186a, 186b. This pressure balance allows creating relatively thin, small and lightweight discs 178a, 178b so that the phase shifts resulting from the Coriolis effects are enhanced. Although shown largely with symmetry, it is envisioned that the flow meter 100 does not need to have mirror image assemblies and good balance could still be accomplished.

Additional Embodiments

Figure 15:
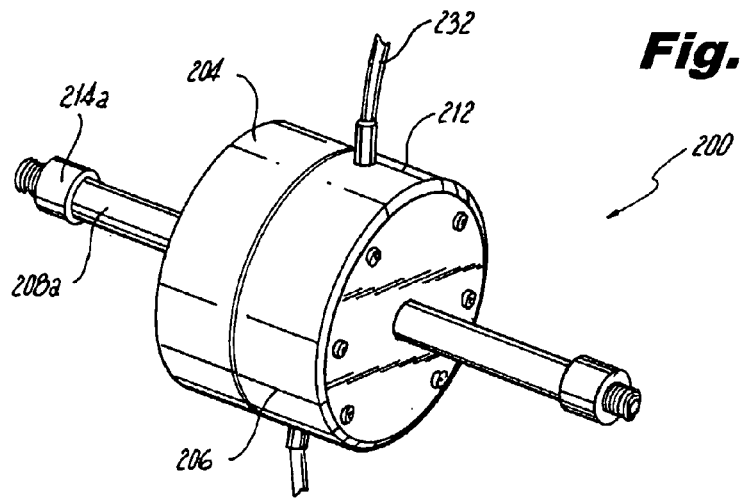
FIG. 15 is a perspective view of another mass flow meter in accordance with the subject invention.

Referring now to FIG. 15, a perspective view of another flow meter 200 is shown. As will be appreciated by those of ordinary skill in the pertinent art, the flow meter 200 utilizes similar principles to the flow meter 100 described above. Accordingly, like reference numerals preceded by the numeral "2" instead of the numeral "1", are used to indicate like elements. Some primary differences of the flow meter 200 in comparison to the flow meter 100 are the lack of U-shaped tubes that creates a partially open flow path between the discs 278a, 278b and a simplified disc 278a, 278b mounting method. The following description is generally directed to the differences.

The flow meter 200 has a high pressure housing 212 capable of maintaining a sealed interior chamber 215 at pressures in excess of 1400 psi. The housing 212 has multiple halves 204, 206 that thread together or are otherwise sealingly coupled. In the embodiment shown, a seal 246 is used to aid in sealing the halves 204, 206. The housing 212 has an inlet tube 208a and an outlet tube 208b terminated with connectors 214a, 214b, respectively, for coupling the flow meter 200 into the fuel flow path.

Figure 16:
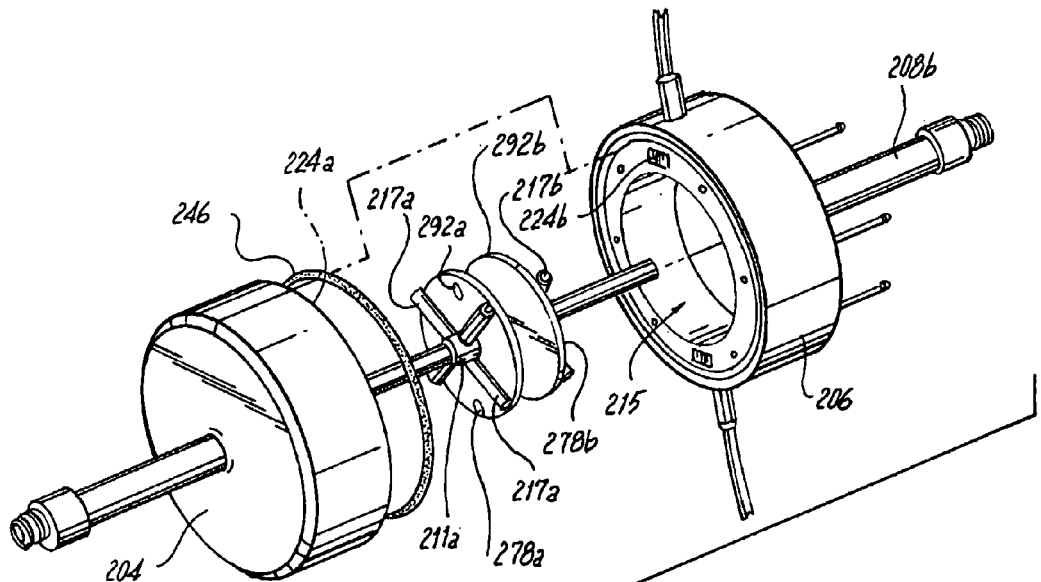
FIG. 16 is a partially exploded perspective view of the mass flow meter of FIG. 15.

Referring to FIG. 16, leading and trailing disc assemblies 218a, 218b are rotatably mounted within the sealed interior chamber 215. The disc assemblies 218a, 218b may mount on traditional bearing arrangements that fix an axial position but allow rotation. Each disc assembly 218a, 218b has an axial tube 211a, 211b, respectively, that couples to the respective disc 278a, 278b, whereas four equally spaced radial legs 217a, 217b are secured to each disc 278a, 278b. It is envisioned that any number of radial legs 217a, 217b may be used.

Figure 17:
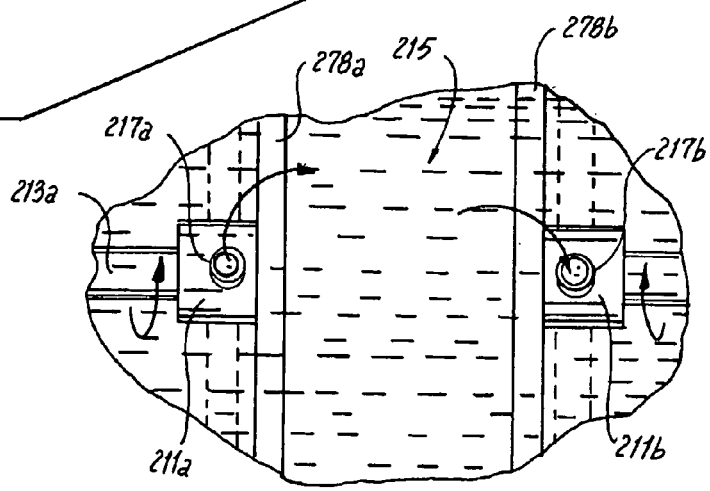
FIG. 17 illustrates the open flow path from the leading disc assembly to the trailing disc assembly in the flow meter of FIG. 15.

Referring to FIG. 17, the open flow path from the leading disc assembly 218a to the trailing disc assembly 218b in the flow meter 200 is shown. The open flow path is created by the radial legs 217a, 217b on each disc 278a, 278b terminating in the sealed interior chamber 215. The sealed interior chamber 215 fills with high pressure fuel so a pressure balance across the axial tubes 211a, 211b, radial tubes 217a, 217b, and discs 278a, 278b is established. This pressure balance allows creating relatively thin, small and lightweight tubes 211, 217 and discs 278a, 278b so that the phase shifts resulting from the Coriolis effects are enhanced. With the enhanced Coriolis effect, the discs 278a, 278b and tubes 211, 217 can also be made quite small to create a small profile flow meter 200.

Referring to FIGS. 15-17, in operation, fuel passes through the inlet tube 208a into the oscillating axial inlet leg 213a. The tube 211a splits and turns the flow into the radial legs 217a. As a result, the fuel is released into the sealed interior chamber 215 but not before creating a Coriolis force in the tube 211a that is transmitted to the leading disc 278a. Again, the Coriolis force exerted on the leading disc 178a causes a phase lag to result in the respective oscillating signal generated by the sensor 224a.

The radial legs 217b of the trailing tube 211b are also in fluid communication with the sealed interior chamber 215 so that fuel passes from the sealed interior chamber 215 into the radial legs 217b. The fluid flow through the radial legs 217b creates another Coriolis effect on the trailing disc 278b that opposes the one created on the leading disc 278a. The trailing tube 211b combines and turns the flowpath into the axial leg 213b, which fluidly connects to the outlet tube 208b. Similar to above, the opposing Coriolis forces create a phase shift in the respective oscillating signals that allows measuring the mass flow. As this phase shift is a differential measurement, the vibration immunity, accuracy over temperature and pressure changes, and frequency response are all improved.

Figure 18A:
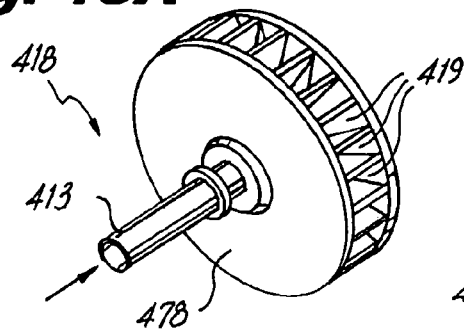
FIG. 18A is a perspective view of an alternative embodiment of a disc assembly for use in a flow meter in accordance with the subject invention, wherein the disc assembly has a disc with a plurality of internal channels.
Figure 18B:
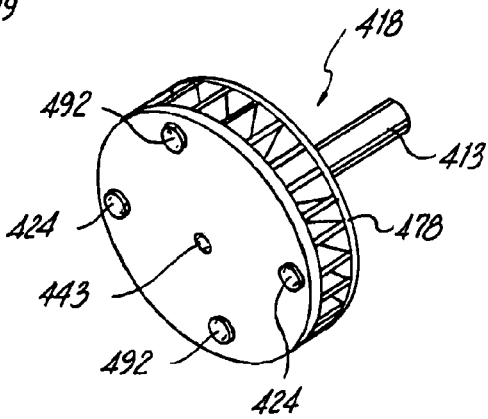
FIG. 18B is a side view of the disc assembly of FIG. 18A.

In another embodiment, the discs 278a, 278b spin as opposed to oscillate. In another alternative embodiment, the flow path does not split but rather simply turns radially outward. It is envisioned that any number of radial legs may be effectively utilized. In another example shown in FIGS. 18A and 18B, an alternative embodiment of a disc assembly 418 for use in a flow meter in accordance with the subject invention is shown. The primary difference of the disc assembly 418 with respect to the disc assemblies 218a, 218b is the use of a disc 478 forming a plurality of internal channels 479 in fluid communication with the inlet flowpath formed in the axial leg 413. The disc 478 may include a magnet/sensor assembly 424/492 for interacting with the motor drive and/or providing positional feedback.

Figure 18C:
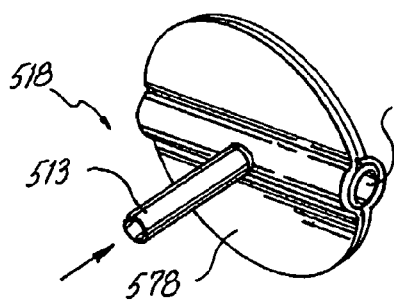
FIG. 18C is a perspective view of still an alternative embodiment of a disc assembly for use in a flow meter in accordance with the subject invention, wherein the disc assembly has a disc formed around radial tubes to form a low drag profile.
Figure 18D:
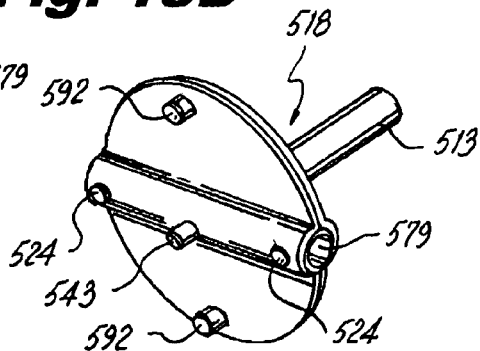
FIG. 18D is a side view of the disc assembly of FIG. 18C.
Figure 18E:
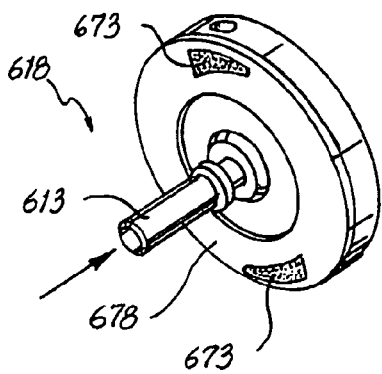
FIG. 18E is a perspective view of another alternative embodiment of a disc assembly for use in a flow meter in accordance with the subject invention, wherein the disc assembly has feedback mechanism with a variable shape component.
Figure 18F:
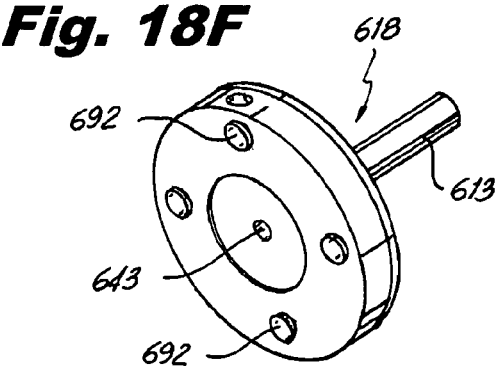
FIG. 18F is a side view of the disc assembly of FIG. 18E.
Figure 18G:
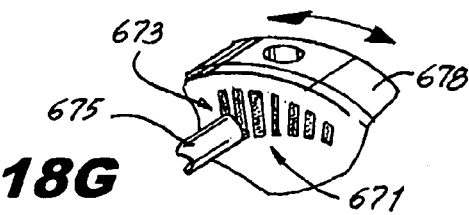
FIG. 18G is a perspective view of the disc assembly of FIG. 18E with the sensor disposed adjacent the variable shape component.

The disc assemblies may also be configured to minimize drag. For example, FIGS. 18C and 18D show another disc assembly 518 with the disc 578 shaped around two radial legs 517 to form a low fluid-drag profile to enhance the sensitivity to the Coriolis effect. Other components of the disc assemblies may also vary and be utilized in various combinations. Referring to FIGS. 18E-G, a disc assembly 618 with an alternative feedback mechanism 671 is shown. The feedback mechanism 671 has a variable shape component 673 mounted on the disc 678 and a sensor 675 for generating a signal indicating a position of the variable shape component 673 and, thereby, the position of the disc assembly 618. The sensor 675 may be a proximity sensor, work from the shape of the component 673, read lines within the component 673 and other methods to detect rotation.

Referring now to FIG. 19, a perspective view of another flow meter 300 is shown. As will be appreciated by those of ordinary skill in the pertinent art, the flow meter 300 utilizes similar principles to the flow meters 100, 200 described above. Accordingly, like reference numerals preceded by the numeral "3" instead of the numerals "1" or "2", are used to indicate like elements. Some primary differences of the flow meter 300 in comparison to the flow meters 200, 100 are the use of a centrally located axial motor, a torsion rod for positioning the disc assemblies, fluid bearings to mount the disc assemblies, and flow channels integral to the housing. The following description is generally directed to the differences.

Referring now to FIG. 20, a partially exploded perspective view of the mass flow meter 300 is shown. The housing 312 is again designed so that the interior chamber 315 is sealed at high pressure. Each half 304, 306 contains disc assemblies 318a, 318b. Near the midpoint 302, the housing 312 contains an axial torque motor 322 intermediate the disc assemblies 318a, 318b for driving the disc assemblies 318a, 318b.

Not only may the axial torque motor 322 be located in the location of the central plug 150 but the axial torque motor 322 can serve the same purpose. In the embodiments above, it would have several benefits. The side tubes 152 are no longer blocked by the motor ring 138 so that flow channels are formed in the housing 312. Such embedded flow channels are less prone to leakage and environmental effects. The overall sensor size and diameter are able to be significantly reduced. More flexibility in arranging the components is also possible. Additionally, the overall the 'dead' volume inside the housing 312, previously taken by a limited functionality spacer, is minimized.

Figure 21:
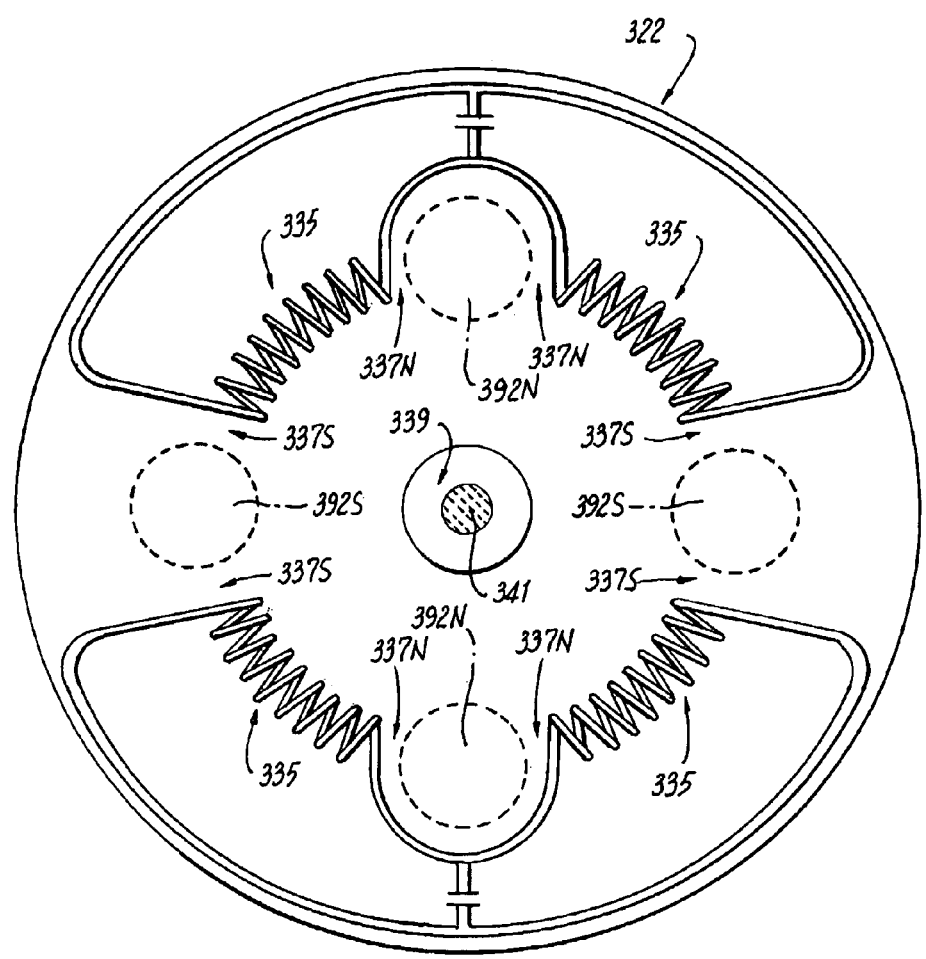
FIG. 21 is a sectional view of the axial torque motor taken along a radial line to illustrate the windings of the axial torque motor of FIG. 20.

Referring now to FIG. 21, a sectional view taken along a radial line illustrates the windings 335 of the axial torque motor 322. The windings 335 create poles 337 ("N" and "S" denote north and south polarity) that interact with the magnets 392 on the disc assemblies 318a, 318b. The magnets 392 ("N" and "S" denote north and south polarity) are shown in phantom lines.

Rather than being mounted on the periphery of the disc assemblies 318a, 318b, the magnets 392 are mounted adjacent the axial torque motor 322 to be closer to the axial torque motor 322. Additionally, the magnets 392 could be set into the disc assemblies 318a, 318b to reduce drag. As would be known to those of skill in the art of motor design, by varying the current in the windings 335, movement of the disc assemblies 318a, 318b can be controlled.

Figure 22:
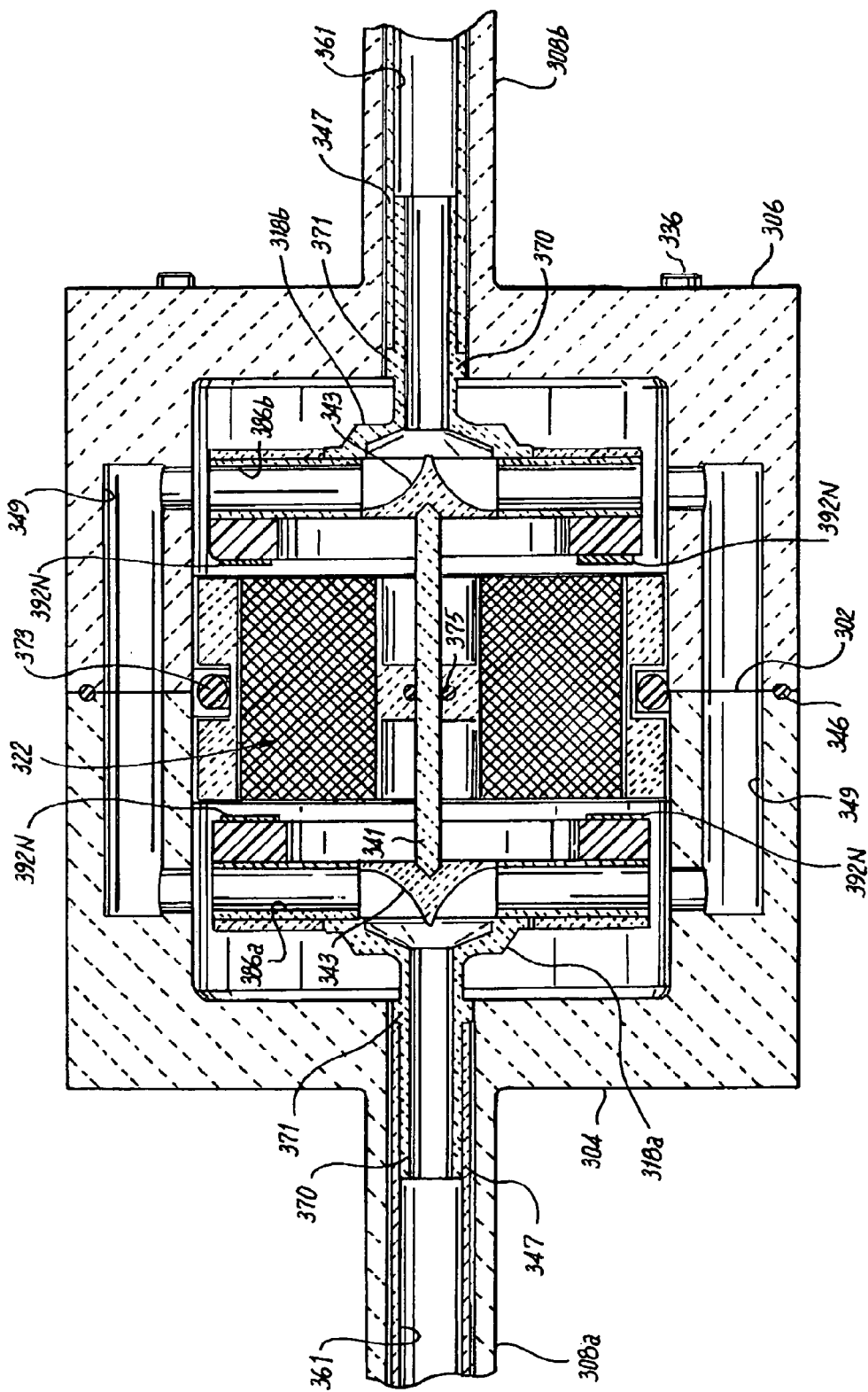
FIG. 22 is a cross-sectional view substantially along lines 22-22 of the mass flow meter as shown in FIG. 19.

Referring to FIGS. 20 and 22, the axial torque motor 322 also may include a central aperture 339 for accommodating a torsion rod 341. The torsion rod 341 extends between the disc assemblies 318a, 318b to restrict movement of the disc assemblies 318a, 318b when a fluid bearing, as discussed below, is utilized. Preferably, the torsion rod 341 restricts the radial and axial movement of the disc assemblies 318a, 318b. The torsion rod 341 rests between pivot points 343 formed in each disc assembly 318a, 318b to automatically center the disc assemblies 318a, 318b.

The disc assemblies 318a, 318b also have position low drag components 345 that work with a complementary component in the housing 312, on the axial torque motor 322 or in nearby mounting location to generate the signal based on oscillation of the disc assemblies 318a, 318b. The slots 345 and related feedback mechanism may be similar to that shown in FIGS. 18E-F.

Figure 23:
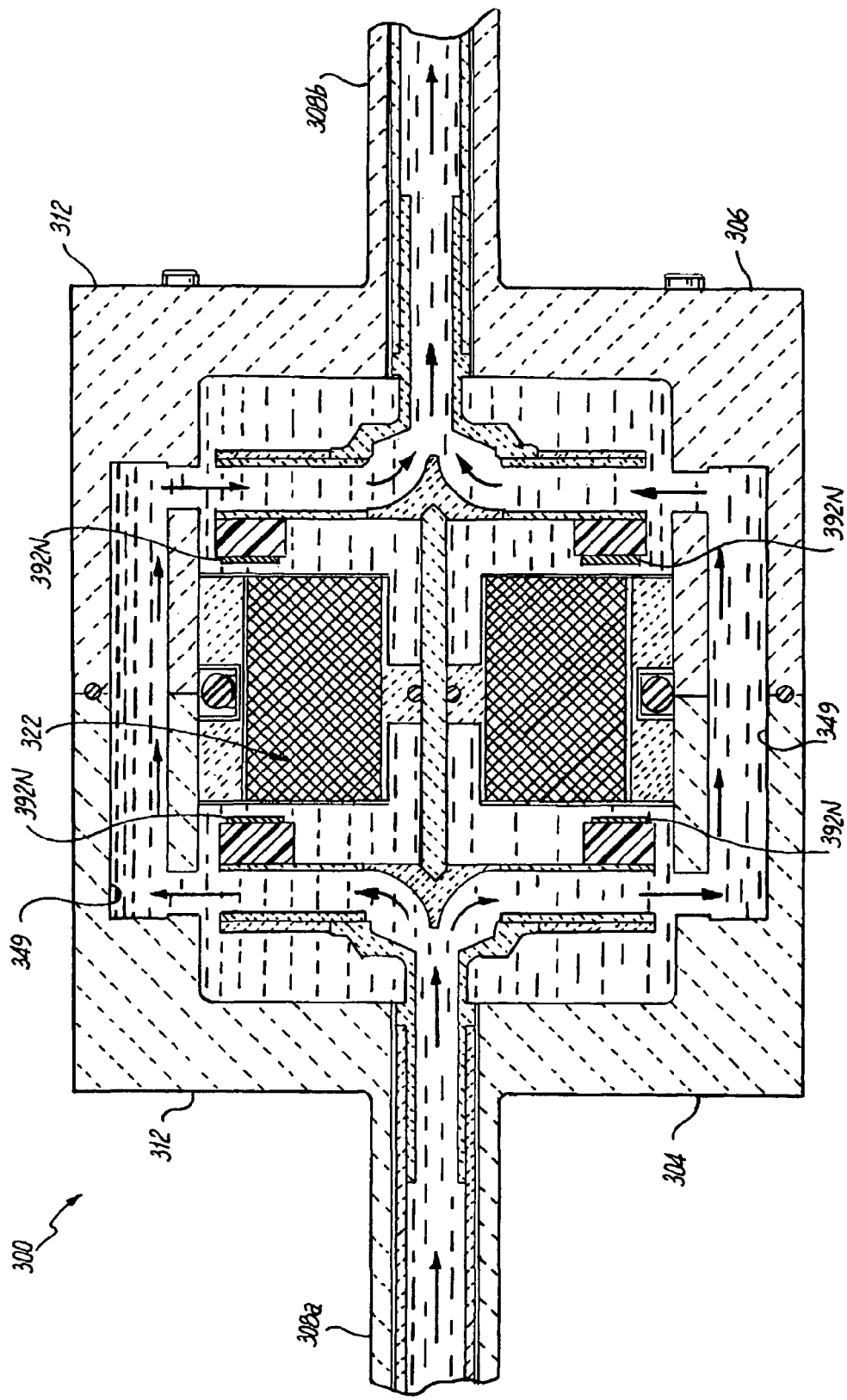
FIG. 23 is another cross-sectional view along the central axis of the mass flow meter of FIG. 19 with fuel in the flow path.

Referring to FIG. 23, a cross-sectional view along the central axis of the mass flow meter 300 of FIG. 19 with fuel in the flow path is shown. The disc assemblies 318a, 318b are mounted for oscillation by fluid bearings 347 formed between the housing 312 and the disc assemblies 318a, 318b. The flanges 370 of the disc assemblies 318a, 318b extends into respective channels 361 formed in the inlet/outlet 308a, 308b of the housing 312 in a tight fitting manner. The fluid not only flows through the flow meter 300 as shown by flow arrows but fills the sealed interior chamber 315 and the channels 361 in the gap around the flanges 370. The fluid in the area surrounding the flanges 370 creates fluid bearings for the disc assemblies 318a, 318b, which are a simpler configuration than the spring mounting described above.

In combination with the torsion rod 341, the fluid bearings allow oscillation of the disc assemblies 318a, 318b while sufficiently maintaining position. The flanges 370 include an expanded neck portion 371 to minimize the flow entering the fluid bearings. In other words, a preferred fluid bearing is a small confined space with a small gap containing relatively incompressible fuel or such a fluid to support the disc assembly weight. The flow meter 300 may include one or both of the torsion rod 341 and fluid bearings as needed for particular applications.

The housing 312 also forms integral flow channels 349 to communicate fluid between the leading and trailing halves 304, 306. In one embodiment, tubes are provided in the flow channels 349. The flow channels 349 substantially align with the radial passages 386a, 386b of the disc assemblies 318a, 318b to provide fluid communication around the axial torque motor 322. The axial torque motor 322 includes an optional outer gasket 373 to prevent cross flow between the leading half 304 and the trailing half 306 of the housing 312. Similarly, the axial torque motor 322 may also include an inner gasket 375 to seal around the torsion rod 341. It can be seen that the flow meter 300 would be able to be constructed of a very small components and, thus, would be able to have a fast response time. The principles of operation would be similar to the flow meters 100, 200 noted above.

Gyroscope Application

The structure of the flow meters 100, 200 can also be utilized as a gyroscope. As a gyroscope, one disables the rotation drive so that the discs do not oscillate and sends a constant flow through the device. As the device rotates around the central axis, opposing twisting torque is generated on the leading and trailing discs. The sensors can measure the resulting phase or angular displacement difference to realize a signal that is proportional to the rate of rotation.

While the apparatus of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A Coriolis effect mass flow meter comprising:
   a) a housing defining an interior chamber having a central axis, an inlet and an outlet;
   b) a leading disc supported for oscillatory movement within the interior chamber of the housing, the leading disc defining a leading flow path in fluid communication with the inlet, wherein a portion of the leading flow path extends radially with respect to the central axis so that fluid passing therein generates a first Coriolis force on the leading disc;
   c) a leading sensor to produce a leading oscillating signal representative of the oscillatory movement of the leading disc;
   d) a trailing disc axially spaced from the leading disc and supported for oscillatory movement within the interior chamber, the trailing disc defining a trailing flow path in fluid communication with the leading flow path and the outlet, wherein a portion of the trailing flow path extends radially with respect to the central axis so that fluid passing therein generates a second Coriolis force on the trailing disc; and
   e) a trailing sensor to produce a trailing oscillating signal representative of the oscillatory movement of the trailing disc, wherein a phase difference between the leading and trailing oscillating signals can be used to determine a mass flow rate of fluid passing from the inlet to the outlet.

2. A Coriolis effect mass flow meter as recited in claim 1, wherein the flow path of the discs is at least partially connected by flow channels formed in the housing.

3. A Coriolis effect mass flow meter as recited in claim 1, wherein the flow path of the discs is formed by a pair of radial passages formed in each disc.

4. A Coriolis effect mass flow meter as recited in claim 3, further comprising a flange centrally located within each disc, each flange having a central passage that bifurcates and turns into a pair of outlets that align with the respective radial passages.

5. A Coriolis effect mass flow meter as recited in claim 4, wherein the inlet flange is centered within a channel formed in the housing to create a fluid bearing.

6. A Coriolis effect mass flow meter as recited in claim 1, wherein the interior chamber contains pressurized fluid.

7. A Coriolis effect mass flow meter as recited in claim 1, the first Coriolis force opposes the second Coriolis force.

8. A Coriolis effect mass flow meter as recited in claim 1, further comprising a motor to drive the discs.

9. A Coriolis effect mass flow meter as recited in claim 8, wherein the motor is within the interior chamber and separates the leading and trailing disc.

10. A Coriolis effect mass flow meter as recited in claim 1, further comprising a torsion rod extending from a pivot point formed in the leading disc to a pivot point formed in the trailing disc.

11. A Coriolis effect device comprising:
    a) a housing defining an interior chamber having a central axis, an inlet and an outlet;
    b) a leading disc supported for oscillatory movement within the interior chamber of the housing, the leading disc defining a leading flow path in fluid communication with the inlet and interior chamber, wherein a portion of the leading flow path extends radially with respect to the central axis; and
    c) a trailing disc axially spaced from the leading disc and supported for oscillatory movement within the interior chamber, the trailing disc defining a trailing flow path in fluid communication with the interior chamber and the outlet, wherein a portion of the trailing flow path extends radially with respect to the central axis.

12. A Coriolis effect device as recited in claim 11, wherein the Coriolis effect device is used as a flow meter and further comprises a motor to drive the discs to oscillate, sensors to produce a leading oscillating signal representative of the oscillatory movement of the leading disc and a trailing oscillating signal representative of the oscillatory movement of the trailing disc, wherein fluid passing from the inlet to the outlet generates opposing Coriolis forces on the discs so that a phase difference between the leading and trailing oscillating signals occurs that can be used to determine a mass flow rate of the fluid.

13. A Coriolis effect device as recited in claim 11, wherein the Coriolis effect device is used as a gyroscope and further comprises a source to provide a constant flow of fluid from the inlet to the outlet, sensors to produce a leading signal representative of a Coriolis force generated by rotational movement of the leading disc and a trailing signal representative of a Coriolis force generated by rotational movement of the trailing disc, wherein an angular displacement difference between the leading and trailing signals can be used to realize a signal that is proportional to the rate of rotation.

14. A Coriolis effect mass flow meter comprising:
    a) a housing defining a sealed interior chamber having an inlet and an outlet;
    b) a leading disc assembly supported for rotational movement within the sealed interior chamber, the leading disc assembly defining a leading flow path having a first end in fluid communication with the inlet and a second end in fluid communication with the sealed interior chamber, wherein at least a portion of the leading flow path generates a first Coriolis force on the leading disc assembly when fluid passes there through;
    c) a leading sensor to produce a leading oscillating signal representative of the movement of the leading disc assembly;
    d) a trailing disc assembly supported for movement within the sealed interior chamber, the trailing disc assembly defining a trailing flow path having a first end in fluid communication with the sealed interior chamber and a second end in fluid communication with the outlet, wherein at least a portion of the trailing flow path generates a second Coriolis force on the trailing disc assembly when fluid passes there through; and
    e) a trailing sensor to produce a trailing oscillating signal representative of the movement of the trailing disc assembly, wherein a phase difference between the leading and trailing oscillating signals can be used to determine a mass flow rate of the fluid passing from the inlet to the outlet.

15. A Coriolis effect mass flow meter as recited in claim 14, wherein the leading flow path and the trailing flow path is at least partially defined by two flow channels in the housing.

16. A Coriolis effect mass flow meter as recited in claim 14, wherein the leading disc assembly includes:

a collar fixed to the housing for supporting the leading disc assembly and defining a central bore and at least one mounting stanchion;

a leading flange having an inlet extending through the central bore to couple with the inlet of the housing and at least one mounting stanchion, wherein the leading flange splits and turns the flow path approximately ninety degrees to form two outlets;

a leading disc fixed to the leading flange and defining radial passages that align with the two outlets; and at least one torsion spring extending between the collar mounting stanchion and the flange mounting stanchion so that the leading flange and leading disc are fixed axially but able to oscillate about a central axis.

17. A Coriolis effect mass flow meter as recited in claim 16, further comprising:

a motor coil to generate an electric field to drive the leading disc; and at least one magnet mounted on the leading disc that will interact with the electric field to move the leading disc.

18. A Coriolis effect mass flow meter as recited in claim 14, wherein the leading disc assembly includes a leading flange and a leading disc fixed to the leading flange, and the trailing disc assembly includes a trailing flange and a trailing disc fixed to the trailing flange, such that tight spacing between the flanges and housing forms fluid bearings to confine radial motion and limit the discs to oscillate rotationally.

19. A Coriolis effect mass flow meter as recited in claim 18, wherein the leading flange has a flange inlet coupled with the inlet of the housing, wherein the leading flange splits and turns the flow path approximately ninety degrees to form two leading flange outlets and the leading disc defines radial passages that align with the two leading flange outlets and the trailing disc defines two radial passages and the trailing flange forms two trailing flange inlets that align with the two trailing disc radial passages, wherein the trailing flange joins and turns the flow path approximately ninety degrees to form a flange outlet coupled with the outlet of the housing.

20. A Coriolis effect mass flow meter as recited in claim 14, further comprising a central spacer intermediate the leading and trailing disc assemblies in the sealed interior chamber, wherein the central spacer is a permeable element that allows fluid to pass there through.

* * * * *